United States Patent
Lindgren et al.

(10) Patent No.: US 11,523,597 B2
(45) Date of Patent: Dec. 13, 2022

(54) DREDGE POSITION CONTROLLER

(71) Applicant: Lindgren-Pitman, Inc., Pompano Beach, FL (US)

(72) Inventors: Peter B. Lindgren, Pompano Beach, FL (US); Timothy Pickett, Pompano Beach, FL (US)

( * ) Notice: Subject to any disclaimer, the term of this patent is extended or adjusted under 35 U.S.C. 154(b) by 230 days.

(21) Appl. No.: 17/082,079

(22) Filed: Oct. 28, 2020

(65) Prior Publication Data

US 2021/0120794 A1 Apr. 29, 2021

Related U.S. Application Data

(60) Provisional application No. 62/927,450, filed on Oct. 29, 2019.

(51) Int. Cl.
| | |
|---|---|
| *A01K 89/01* | (2006.01) |
| *A01K 89/0165* | (2006.01) |
| *A01K 91/08* | (2006.01) |
| *B63B 35/14* | (2006.01) |
| *B63B 3/00* | (2006.01) |
| *B65H 7/00* | (2006.01) |
| *G05B 13/00* | (2006.01) |

(52) U.S. Cl.
CPC .......... *A01K 89/0165* (2013.01); *A01K 91/08* (2013.01); *B63B 3/00* (2013.01); *B63B 35/14* (2013.01); *B65H 7/00* (2013.01); *G05B 13/00* (2013.01)

(58) Field of Classification Search
CPC .. A01K 89/0165; A01K 89/05; A01K 91/053; A01K 91/08
See application file for complete search history.

(56) References Cited

U.S. PATENT DOCUMENTS

| | | | |
|---|---|---|---|
| 4,932,602 A | 6/1990 | Scott | |
| 7,188,793 B2 | 3/2007 | Ikuta et al. | |
| 7,559,499 B2 | 7/2009 | Nakagawa et al. | |
| 7,757,989 B1 | 7/2010 | Huffman et al. | |
| 7,905,440 B2 | 3/2011 | Ikuta et al. | |
| 8,398,011 B2 | 3/2013 | Kuriyama et al. | |
| 8,770,504 B1 | 7/2014 | Sandstrom | |
| 9,578,862 B2 | 2/2017 | Taboada | |
| 9,585,375 B2 | 3/2017 | Miyamae | |
| 10,130,085 B2 | 11/2018 | Ishikawa et al. | |
| 10,130,086 B2 | 11/2018 | Adelman | |
| 10,165,767 B1 | 1/2019 | Sandstrom | |
| 2011/0192071 A1 | 8/2011 | Adelman | |
| 2011/0259988 A1* | 10/2011 | Strohecker | A01K 89/0183 700/275 |
| 2019/0200593 A1 | 7/2019 | Teklinski | |

* cited by examiner

*Primary Examiner* — Emmanuel M Marcelo
(74) *Attorney, Agent, or Firm* — McHale & Slavin, P.A.

(57) ABSTRACT

A position controller for electronically monitoring the position and speed of a dredge. The position controller consists of an electric powered line winding spool with an electric encoder to indicate line speed and position to a microprocessor. A drag control assembly with electric control is used to increase, decrease or set the drag at desired setting by microprocessor control. Touch screen microprocessor interface is the preferred method to enter settings into the system and allow display/control through multiple preexisting marine electronic devices throughout a fishing boat.

16 Claims, 3 Drawing Sheets

DREDGE POSITION CONTROLLER

PRIORITY CLAIM

In accordance with 37 C.F.R. § 1.76 a claim of priority is included in an Application Data Sheet filed concurrently herewith. Accordingly, the present invention claims priority to U.S. Provisional Patent Application No. 62/927,450, entitled "DREDGE POSITION CONTROLLER", filed Oct. 29, 2019. The contents of the above referenced application are incorporated herein by reference.

FEDERALLY SPONSORED RESEARCH OR DEVELOPMENT

Not Applicable

FIELD OF THE INVENTION

The invention is directed to the field of fishing and in particular to a position controller for use in controlling the deployment and retrieval of teaser lures towed behind a fishing boat.

BACKGROUND OF THE INVENTION

Teasers consist of artificial lures, without hooks, that are towed by fisherman along the side of fishing boats to attract fish. There are several teaser reel designs developed through the years including the use of electric reels. It is common for a fisherman to tow several teaser lures alongside a boat to make the boat appear it is attracting a school of fish. For instance, the fisherman may tow 25 teaser lures on each side of a boat, the lures do not include hooks or any other means of securing fish. A teaser assembly includes lures that when towed underwater using weights and/or planers are typically referred to as a "dredge" due to the depth beneath the surface of the water the assembly is operated at. The resulting high towing tension placed upon the assembly due to water resistance is extremely high making it impossible for manual retrieval unless the boat is slowed down or a mechanical advantage is employed. Towing loads depend on the design of the lures, weights, number of lures, speed of the vessel, and so forth. A dredge requires at least a 200 lb test line to assure the teaser lures are not lost during towing or retrieval. The tow loads on dredges are too high for hand retrieval. For instance, when a fish has been hooked it is desirable to retrieve the dredges to prevent interference with fish retrieval. However, stopping of the boat to allow retrieval is unacceptable for any relaxation of the line pressure used to hook a fish can result in loss of the fish.

The underwater lure assembly is towed from an outrigger pole projecting aside the fishing boat with a pulley leading to a winding device. Unless sea conditions are calm the fishing boat movement in response to ocean waves will cause slack and jerking on the tow line. While for fish teasers placed on the ocean surface such movement can be desirable because surface splashing is effective for attracting fish. However, for dredges the jerking can cause serious problems including but not limited to, back lashes of wound line, line tangles, very high tow tension spikes that can break the tow line, and non-natural jerky movement of the teaser lures. To solve the problem a fisherman may manually adjust the drag mechanism to slip at a critical setting conditions to prevent problems. After the drag slips the position must be reset. This procedure can take place often and is disruptive to the fishing process. If set improperly the above-mentioned problems occur, and constant manually adjustment is a burdensome task.

Removing the dredge from a deployed position when a fish is hooked to prevent entanglement during fish retrieval, often the dredge is simply retrieved to discourage an unwanted fish, clean grass, debris, repositioning, and so forth. Current devices require a skilled fisherman to control the dredge which is time consuming and takes valuable time away from other activities.

Known prior art dredges include designs that are effective in attracting fish. Tekinski U.S. Patent Publication No. 2019/0200593 which discloses a dredge rigging device formed from three rod members having a V-shaped central portion with two arms extending therefrom. Adelman U.S. Patent Publication No. 2011/0192071 discloses a collapsible luring dredge comprising a hub assembly having a plurality of separate hub sections each adapted to hold an extended spreader bar and together joined into a stacked unit assembled along a central axis with a pair of spring-loaded detents disposed therein on opposite sides of the central axis. U.S. Pat. No. 10,130,086 to Adelman, discloses a fixed bar luring dredge comprising a core member tubular in form and assembled to hold a plurality of spreader bars extending through and attached to the core member in a fixed radial pattern with each spreader bar being disposed in a separate and distinct plane to enhance the strength and support of the spreader bar members in trolling. U.S. Pat. No. 9,578,862 to Taboada, discloses a dredge having replaceable arms which is configurable to laterally couple at least two hubs with a plurality of arms having at least one teaser attachment and hub configured to removably retain the arms in a radial orientation.

Electric reels are known in the art. Improved electric reels include provisions to reduce the risk of backlash but fail to recognize the problems associated with towing large dredges, or the use of a dynamic control system. U.S. Pat. Nos. 10,165,767; 9,661,855; and 8,770,504 to Sandstrom, disclose a variable speed electric reel with wireless communication.

Casting reels with microprocessors are also known in the art. U.S. Pat. No. 10,130,085 to Ishikawa discloses a casting reel with a detector and controller for determination that terminal tackle has landed on water from rotation detector. U.S. Pat. No. 8,398,011 to Kuriyama, discloses a hand crank fishing reel with temperature or torque sensors to send an electric signal to adjust reel spool drag. U.S. Pat. No. 7,905,440 to Takeshi, discloses a wireless communication from a remote fish finder that can display the terminal tackle depth and sea floor depth to display on the fishing reel. U.S. Pat. No. 9,585,375 to Miyamae, discloses radio communications near field of one or more reels via Wi-Fi or Bluetooth including fishing reel ID for control of multiple reels. U.S. Pat. No. 7,757,989 to Huffman, discloses a manual teaser reel that makes a sound. U.S. Pat. No. 7,559,499 to Nakagawa, discloses a tension, torque, speed, and depth detector on a fishing rod with communication to transmit to external apparatus. U.S. Pat. No. 7,188,793 to Ikuta discloses, a method of communicating data from a circuit board to rotating coils on a wire coil to control braking of a fishing spool in a compact design with insulated circuit board. U.S. Pat. No. 4,932,602 to Scott, discloses a fishing downrigger with a brake actuator for automatic braking. What is lacking in the industry is a dredge position controller.

SUMMARY OF THE INVENTION

A position controller for electronically monitoring the position and speed of a dredge. The position controller consists of an electric powered line winding spool with an electric encoder to indicate line speed and position to a microprocessor. A drag control assembly with electric control is used to increase, decrease or set the drag at desired setting by microprocessor control. The controller consists of a winding spool housing having a spool rotatably secured to the housing for securing a length of tow line. The spool having a reel and level winder capable of drawing at least 200 lb test tow lines. The distal end of the tow line attached to a teaser lure assembly that is trolled behind a vessel. A drive motor coupled to a gear and drag clutch assembly for rotation of the spool, and a drag feedback assembly having a drag feedback assembly such as a potentiometer or optical and Hall effect sensor coupled to a drag motor and drive motor through said gear and drag clutch assembly. An encoder provides line speed and line position. A microprocessor is constructed and arranged to calculate drag feedback and encoder line and position for use in setting and hauling the teaser lure assembly with protocols for communicating on a wired digital bus to allow position commands for display throughout the boat.

An objective of the invention is to provide a dredge assembly that is operationally safer, trouble free, accurate and allows precision control of teaser positioning without crew involvement for manual positioning.

Another objective of the invention is to eliminate high towing loads and resulting line failures that commonly lead to loss of dredges.

Still another objective of the invention is to provide a mechanical drag with separate electric motor, gear reduction and rotating threaded pressure actuation system to provide a precision-controlled operation.

Yet another objective of the invention is to disclose a microprocessor controlled winding spool drag system allowing the drag to safely react and slip at very high loads to protect teaser assemblies from numerous conditions including particular dredge design or oversize dredge that may present a large resistance when towed, sea grass entanglement, excessive trolling speeds, large waves, confused waves, boat jerking, and so forth.

Another objective of the invention to provide a wired digital information bus allowing an interface and control with an existing marine electronic display.

Another objective of the invention is to provide a wired digital information bus that can display information generated from other sources on the same or similar network.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
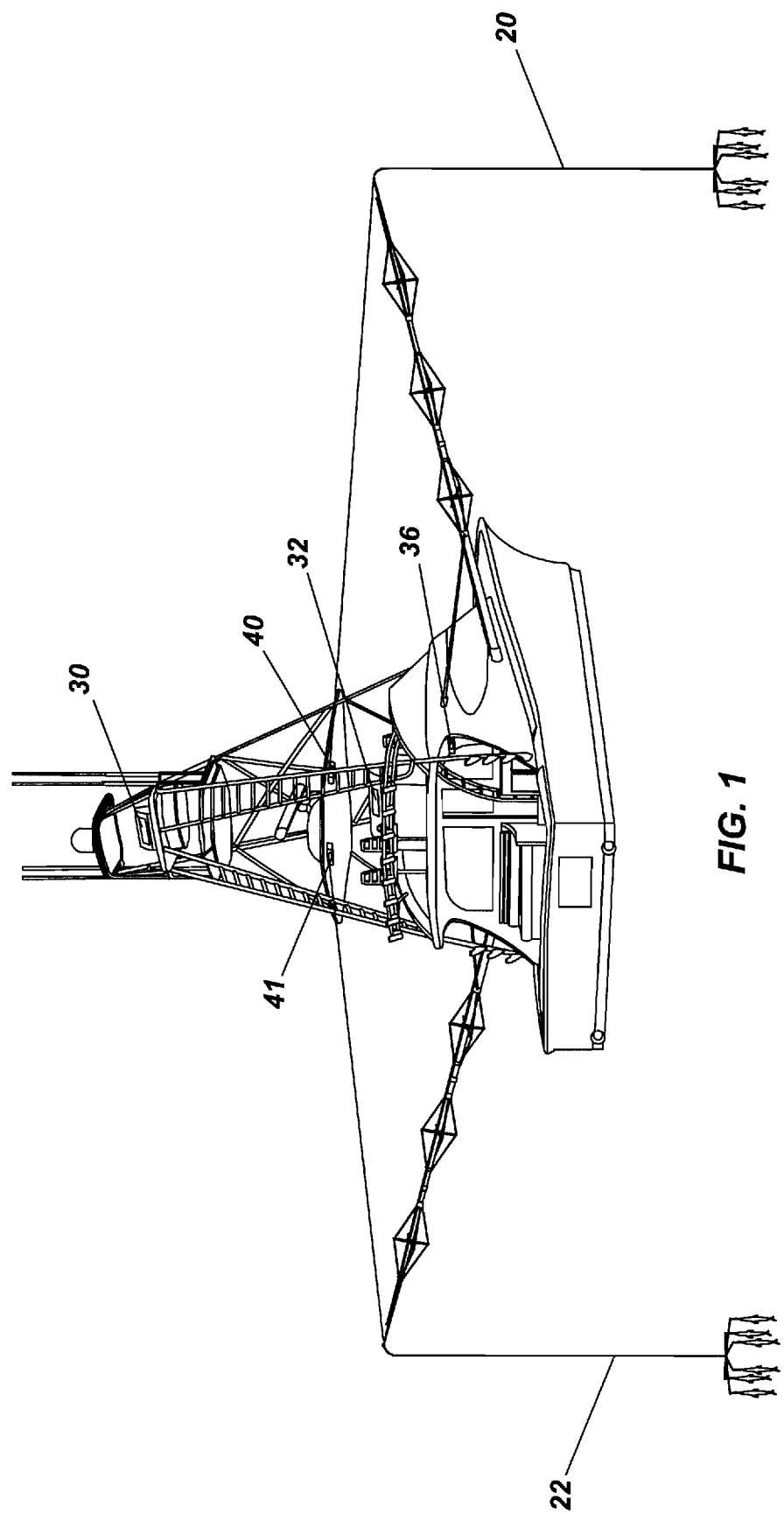
FIG. 1 is a pictorial view of the present invention installed upon a fishing vessel.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

The current invention is a position controller for electronically monitoring the position and speed of a dredge. The position controller consists of an electric powered line winding spool with an electric encoder to indicate line speed and position to a microprocessor. A drag control assembly with electric control is used to increase, decrease or set the drag at desired setting by microprocessor control. Touch screen microprocessor interface is the preferred method to enter settings into the system.

Examples of settings set in the microprocessor via touch screen include: Top standby position; Overboard final tow position; Setting speed; Setting drag clutch positions; and Sea states. For example, sea states can include wave heights and wave periods wherein a preset adjustment (1-5 or 1-10) may be preprogramed for the drag system to accommodate the particular seat state. Other simple commands can include IN and OUT with a Jog command to alter settings.

The microprocessor is designed to interface with existing boat mounted marine electronics. Modern marine electronics display many data sources including navigation, depth and fish finding, bottom topography, radar etc. Additional information can also be displayed on the screen such as engine data and engine room video and night vision. Commonly the touch screen display only illustrates information for the device and is not used to send out data to control other accessories. This is an exception for the mobile industry where the CAN bus information is used to control almost all functions of vehicles. The lack of control is because the accessories do not have modified bus software designed to operate on digital information of bus custom protocol such as NMEA. There are several communication busses today for Nexxus products, namely FOX for RayMarine, SeaTalk, Garmin One Helm, and Simrad has Simnet. National Marine Electronics Association (NEMA) protocol is a growing standard for many marine electronics used today. In the preferred embodiment, an offshore fishing boat using dredge and the position controller of the instant invention may have a touch screen on the fly bridge, additional screens on the tower, cockpit and/or salon. It is desirable during fishing operations to have multiple control positions for the dredge reel using a common bus especially if the same screen can provide additional information and control. This allows any member of the crew to have information and Take action. This is highly desirable for offshore fishing. Multiple station control is already operational in larger boats for steering, throttle, and transmission on separate system. The current invention interfaces with a modified bus protocol like NMEA or CAN and others to maximize user benefits.

The microprocessor forms the base of a server having user interface functional software, such as a web page, allowing the user to generate a custom user interface for commanding and monitoring the reels on the remote platform. The service provides a gateway between networks in the system. For instance, a network between an TCP/Ethernet network that the user interfaces reside upon and the CAN network that the reels reside upon. The server manages the reels on the network assigning addresses for correlating a reel's unique addresses to physical locations so the user is aware which reel is being controlled and its location on the vessel. The system also monitors the communication status with each reel and alerts the user when a reel stops communicating or when a new reel comes onto the network. Further, the system gather information synchronously or asynchronously from the reels, organizing and scaling it as required from the user interface, as well as takes commands from the user interface and sends the commands to a specific reel.

In the preferred embodiment, the position controller includes at least two powered winding spool assemblies mounted overhead of the vessel steering and engine controls with an electric winding unit directed starboard and a second electric winding unit directed to port. Each winding spool consists of a 200 lb or higher tow line which is directed outwardly to pulleys on outriggers for the purpose of placing the dredge at the desired distance outboard of the boat. Each winding spool assembly having a microprocessor controller that will interface with boat mounted marine electronics.

Control from a previously installed or independent touch screen operated marine electronics to the winding spool microprocessor is performed by a common information bus such NMEA. This interface reduces wiring to 3 wires to the independent marine electronics and allows access to information from other sources that are desirable for display at no additional cost. Examples are GPS position, water temperature, speed and depth. In most cases an independent touch screen to operate the winding spool microprocessor is not required because the microprocessor can be interconnected with existing marine controls. In situations where the user has marine electronics with the appropriate screens already in the desired location, the winding spool microprocessor can interface with existing display screens instead of using an independent marine electronic screen. Wherein the winding spool microprocessor is interfaced with existing electronics, or based upon an independent electronic display, what is viewed and controlled on the screen is at the user option. Unique to this invention is the use of the ability of the existing marine electronics to interface with the winding spool microprocessor wherein the winding spool can be controlled.

During ordinary operation of the device, the user need only request to pay OUT and the microprocessor controls the winding spool to loosen a drag system until the tow line spools out at the preset rate to a preset location and, then increases the drag on the winding spool to hold a dredge at the set location. The user can retrieve the dredge simply by requesting IN and the microprocessor will retrieve the dredge to the preset standby setting. If the drag slips the microprocessor can make corrections or indicate by an alarm function that the tow retrieval exceeds a predetermine pull weight, typically limited by tow line strength. When setting out the dredge, the microprocessor releases the drag slowly until the dredge is traveling at an acceptable speed without risk of backlash or the like problems that occur from improper controlling the speed of a spool payout and stoppage. If the sea or boat conditions cause an output of the line to increase to a risky speed, such as a possible backlash condition, the microprocessor will increase the drag to correct the speed automatically.

A winding spool drag system is located between a motor drive system and a line winding spool allowing the drag to safely react and slip at very high loads. High loads can come from numerous conditions. For instance, the particular dredge design or oversize dredge may present a large resistance when towed. High low can result in sea grass entanglement, excessive trolling speeds, large waves, confused waves, boat jerking, and so forth. The drag eliminates dangerous high loads and line failure to prevent loss of the teaser assembly.

In operation, when a drag allows line payout during use, an encoder sends information to the microprocessor that can set the dredge to a predetermined location. Settings for dampening, gain and reset of the microprocessor including an independent motor and drag setting system results in trouble free set and recovery of the teaser lures assembly. The winding spool does not have a line tension detector, a manual crank, and is not securable to a fishing rod. Braking of the tow line is controlled by the microprocessor sensing speed and adjusting to a preset goal. Drag surfaces are actuated by a 14-pitch thread and motor with gear reduction.

The ability to control the drag system accurately and smoothly is critical to provide uninhibited operation of the system. Drag release too fast will cause backlash due to high acceleration of the spool. In the drag mechanism of the preferred embodiment, a mechanical drag with separate electric motor, gear reduction and rotating threaded pressure actuation system provides a precision-controlled operation. Drag actuation adjustment distance pay out to full drag may move less than 0.100 inches against springs holding drag pressure and resulting tension. The current invention uses a DC motor control with two reduction systems to assure that release is smooth and repeatable. The system to press the drag surfaces together is a fine male threaded section of 14 pitch/inch or 0.071 inches revolution surrounded by a female mating thread that is fixed to and rotated by a 50-tooth worm gear. The DC motor output has a speed reducer 10:1 with output attached to a single pitch worm gear. The worm gear also drives a second 20 tooth worm gear driving to drag feedback assembly such as a 5-turn potentiometer. A potentiometer indicates to the microprocessor where the drag is set at all times via voltage or current through the resistor. Alternatively drag feedback may also be obtained by an optical and Hall effect sensor. Motor speed can be adjusted by variable speed drive up to 5000 rpm to tune control. This system has shown to have excellent control to repeat user settings. The instant invention uses the wired digital information bus with internal software to communicate with other modified marine digital information bus. The dredge controller does not employ a temperature or torque sensor and does not convert into an electric signal. The dredge controller is not a casting reel and does not have terminal tackle for casting or catching fish.

The figures illustrate one embodiment of the present invention described supra and the manner in which it is used, with like components numbered consistently throughout. FIG. 1 depicts a fishing boat with dredge assemblies 20 and 22 deployed, in which at least one position controller 40 is constructed and arranged to control the positioning of the dredge assemblies. In the present embodiment, a second identical position controller 41 can be installed allowing control from different stations on the boat. It is contemplated that multiple position controllers could be installed to allow deployment of multiple dredges assemblies from both the port and starboard sides of the fishing vessel. Additionally, the position controllers 40 and 41 would be constructed and arranged to communicate with multiple marine electric consoles. For example, the tower console 30 and the main bridge console 32 are constructed and arranged to control the position controller via a bus. Additionally, a console 36 mounted on the main deck would also be capable of operating the position controller 40 via a touch screen with a bus.

Figure 2:
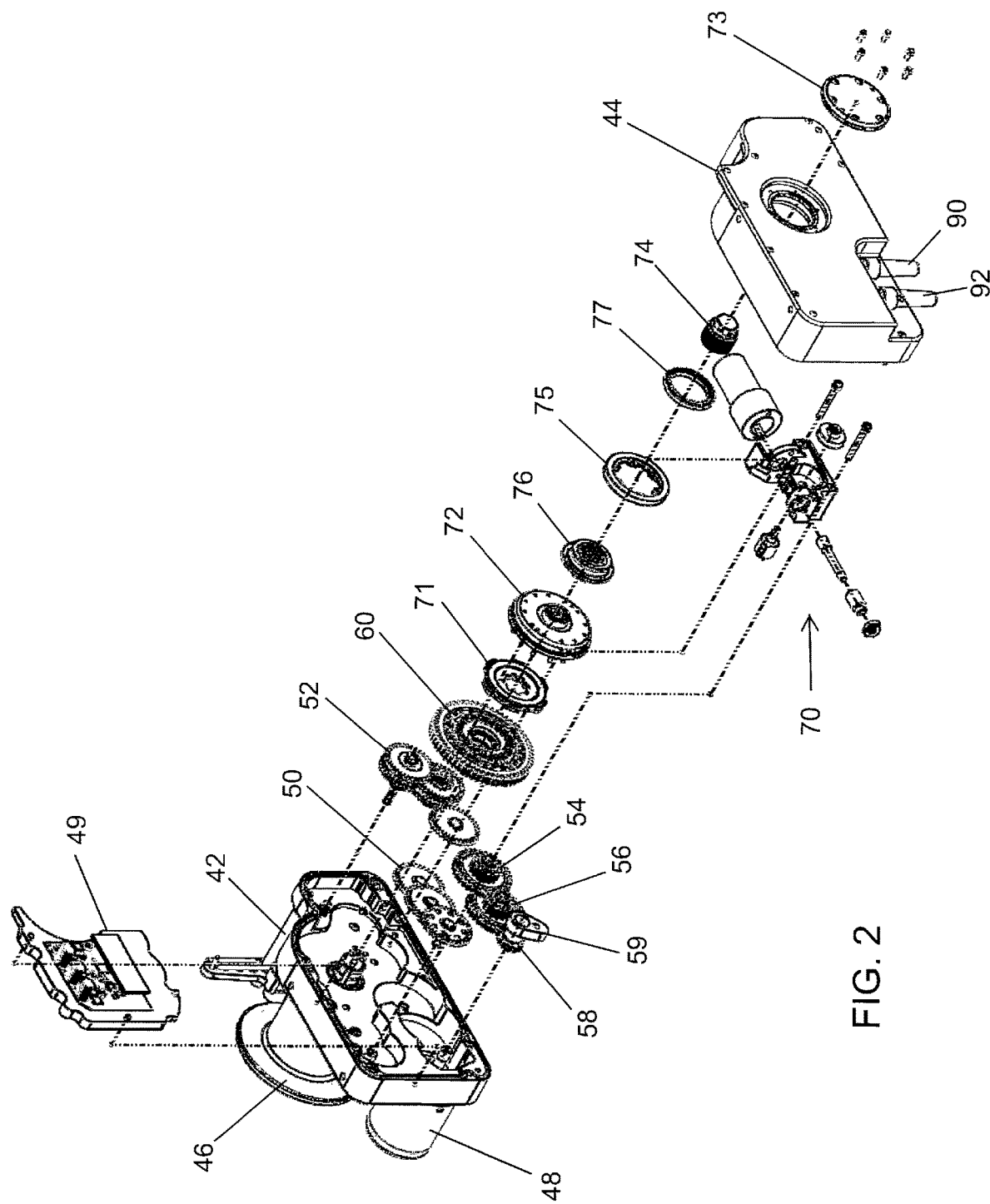
FIG. 2 is an exploded view of the present invention.

FIG. 2 is the position controller 40 having a hollow body 42 and a body cover 44. The position controller 40 includes a spool 46, a motor 48 and a circuit board 49, which are constructed and arranged to cooperate with an interconnected gearing assembly for operation of the device. The gearing assembly includes a gear set 50 that includes magnets configured to communicate speed signals to the circuit board 49. The gear set 50 cooperate with a plurality of level winder gears 52, compound speed reducing gears 54, 56, motor pinion 58 and an anti-reverse gear 59. The gearing assembly further includes a main drive gear 60.

Figure 3:
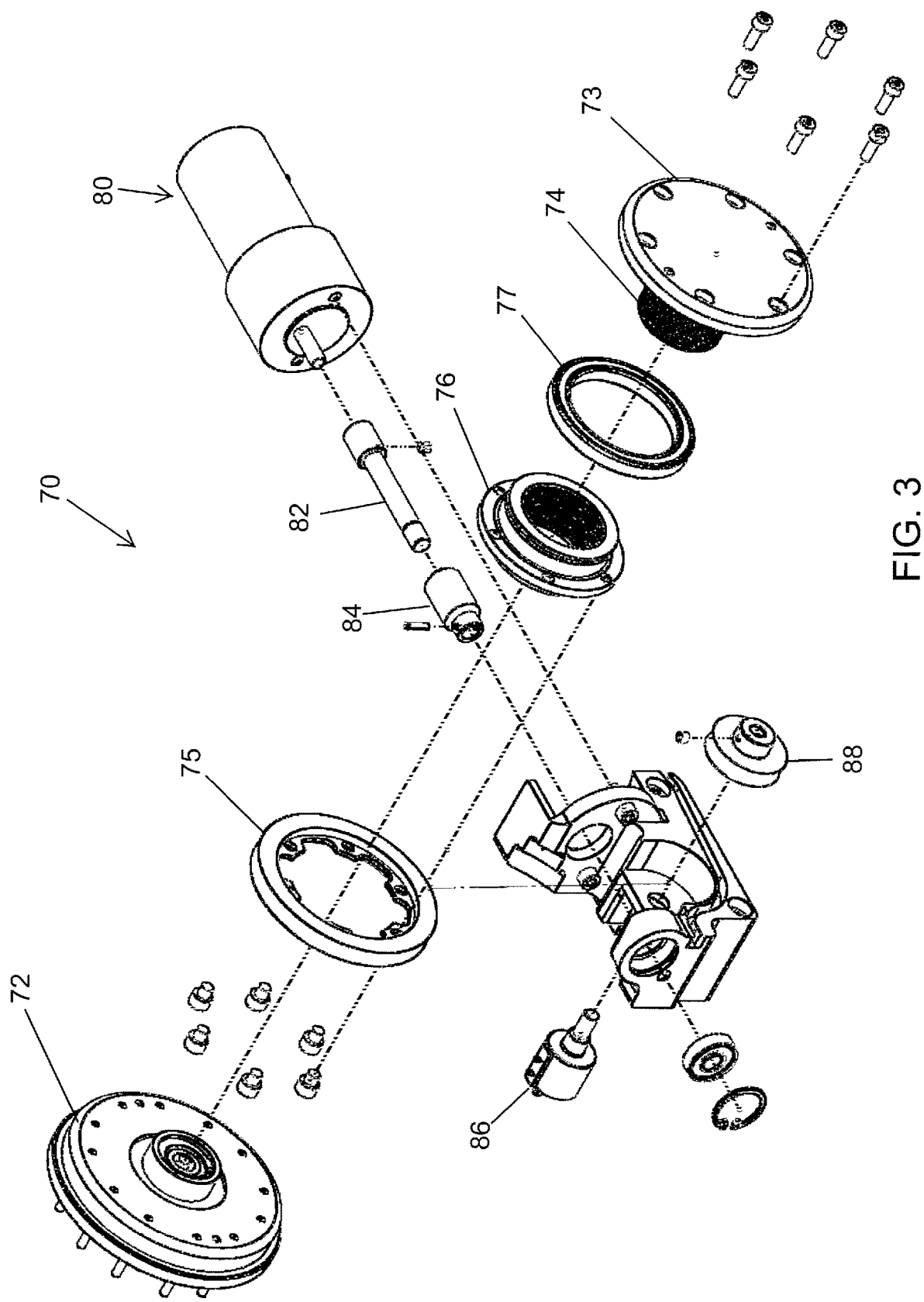
FIG. 3 is an exploded view of the drag position feedback assembly disclosed in FIG. 2.

The position controller 40 further includes a drag position feedback assembly 70 which is illustrated in FIGS. 2 and 3. A plurality of drag plates 71 cooperate with drag pressure plate 72. A stator retainer cover 73 has a male threaded stator 74 fixedly attached. The male threaded stator 74 is configured to fixedly attach to plate 72 for positioning of a worm gear 75, a female thread 76 configured to advance drag and a bearing 77.

The drag position feedback assembly 70 having a base 80 for supporting of a drag motor 80 that is attached to a motor shaft extension 82 that cooperates with a worm gear 84. The drag position feedback assembly 70 further includes a potentiometer 86 and a worm gear 88, alternatively an optical and Hall effect sensor may be employed. The circuit board 49 is electrically connected to a power wire 90 and a data wire 92.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

What is claimed is:

1. A position controller for electronically monitoring the position and speed of a towing load comprising:
    a winding spool housing;
    a spool rotatably secured in said winding spool housing for securing a length of tow line having at least 200 lb test, said tow line having a distal end attached to a teaser lure assembly for trolling behind a vessel; a drive motor coupled to a gear and drag clutch assembly for rotation of said spool;
    a drag feedback assembly coupled to a drag motor and said drive motor through said gear and drag clutch assembly;
    an encoder providing line speed and line position; and
    a microprocessor to calculate drag feedback and encoder line and position;
    wherein said position controller is used in setting and hauling said teaser lure assembly using protocols for communicating on a wired digital bus to allow position commands and screen display.

2. The position controller according to claim 1 wherein said drive motor coupled to said drag feedback assembly has a gear reduction of approximately over 100:1 .

3. The position controller according to claim 1 wherein said drag clutch assembly may achieve over 200 in, lbs. torque.

4. The position controller according to claim 1 wherein said drag clutch system is replaced by a motor regeneration drive system with encoder.

5. The position controller according to claim 1 wherein said digital bus is selected from NEMA, Seatalk, Simnet, Garmin One Helm, or a CAC bus configuration.

6. The position controller according to claim 1 wherein said display is touch screen allowing ease of setting insertion to said microprocessor.

7. The position controller according to claim 1 wherein said position controller is mounted overhead of a primary engine and steering control station of a vessel having for interfacing with existing marine electronics.

8. The position controller according to claim 1 wherein said microprocessor is controllable through multiple locations by multiple users by use of a digital communication bus.

9. The position controller according to claim 8 wherein said digital bus is a NEMA, Seatalk, Simnet, One Helm, or a CAC bus configuration.

10. The position controller according to claim 8 wherein said microprocessor has information and control of both said drive motor and said drag clutch system to operate the system to user preset conditions.

11. The position controller according to claim 1 wherein said drag is electronic induced using motor control in a regenerative state.

12. The position controller according to claim 1 wherein said microprocessor control is programmed to compensate for various sea states.

13. The position controller according to claim 1 wherein said drag clutch assembly includes a threaded shank and a worm gear reducer portion for adjusting the drag setting to prevent said teaser lure assembly trolled behind a vessel from being strapped out from said spool.

14. The position controller according to claim 1 wherein said drag clutch assembly is controlled with current directed through said drive motor.

15. The position controller according to claim 1 wherein said drag clutch system includes friction inducing plates.

16. The position controller according to claim 1 wherein said drag clutch system is magnetic.

* * * * *